United States Patent
Gutierrez et al.

(10) Patent No.: US 12,205,065 B2
(45) Date of Patent: Jan. 21, 2025

(54) CONTINUOUS INTEGRITY MONITORING FOR AUTONOMOUS TRANSPORTATION SERVICES

(71) Applicant: Intel Corporation, Santa Clara, CA (US)

(72) Inventors: Christopher Gutierrez, Hillsboro, OR (US); Marcio Juliato, Portland, OR (US); Qian Wang, Portland, OR (US); Shabbir Ahmed, Beaverton, OR (US); Vuk Lesi, Cornelius, OR (US); Manoj Sastry, Portland, OR (US)

(73) Assignee: INTEL CORPORATION, Santa Clara, CA (US)

( * ) Notice: Subject to any disclaimer, the term of this patent is extended or adjusted under 35 U.S.C. 154(b) by 754 days.

(21) Appl. No.: 16/994,089

(22) Filed: Aug. 14, 2020

(65) Prior Publication Data

US 2020/0372460 A1    Nov. 26, 2020

(51) Int. Cl.
G06Q 10/0833    (2023.01)
G08G 1/00    (2006.01)
H04L 9/08    (2006.01)
H04L 9/32    (2006.01)

(52) U.S. Cl.
CPC ......... G06Q 10/0833 (2013.01); G08G 1/205 (2013.01); H04L 9/085 (2013.01); H04L 9/3242 (2013.01)

(58) Field of Classification Search
CPC .... G06Q 10/0833; G08G 1/205; H04L 9/085; H04L 9/3242
See application file for complete search history.

(56) References Cited

U.S. PATENT DOCUMENTS

| | | | |
|---|---|---|---|
| 10,111,043 B1 * | 10/2018 | Cirit | H04W 4/023 |
| 11,222,486 B1 * | 1/2022 | Subramanian | G06Q 10/0833 |
| 2009/0015400 A1 * | 1/2009 | Breed | G07C 9/28 340/539.22 |
| 2016/0379157 A1 * | 12/2016 | Nassar | G06Q 10/083 705/337 |
| 2019/0165946 A1 | 5/2019 | Unagami et al. | |
| 2020/0005559 A1 | 1/2020 | Grunbok et al. | |
| 2021/0043091 A1 * | 2/2021 | Solomon | G01S 5/0027 |
| 2021/0216958 A1 * | 7/2021 | Pacheco | G06K 19/0723 |
| 2022/0092532 A1 * | 3/2022 | Bevan | G06Q 10/0835 |

FOREIGN PATENT DOCUMENTS

| | | |
|---|---|---|
| CN | 114143006 A | 3/2022 |
| EP | 3955192 A1 | 2/2022 |
| WO | 2020005722 A1 | 1/2020 |

OTHER PUBLICATIONS

Yantao Li, Keyed hash function based on a dynamic lookup table of functions, 2012, 56-58 (Year: 2012).*
European Search Report and Written Opinion for the European Patent Application No. 21184952, mailed Dec. 17, 2021, 8 pages.

* cited by examiner

Primary Examiner — Ibrahim N El-Bathy
(74) Attorney, Agent, or Firm — JEFFERY WATSON MENDONSA & HAMILTON LLP

(57) ABSTRACT

Systems, apparatuses, and methods to attest to and verify the integrity of cargo during transport by an autonomous vehicle are provided. An autonomous vehicle can discretize parameters associated with transportation of cargo and can generate a keyed hash digest from the discretized parameters. The keyed hash digest can be sent to a stakeholder in the transportation of the cargo to attest to the integrity of the cargo during transport.

12 Claims, 11 Drawing Sheets

CONTINUOUS INTEGRITY MONITORING FOR AUTONOMOUS TRANSPORTATION SERVICES

BACKGROUND

Modern transportation increasingly relies on automations, such as, autonomous vehicles. Often, persons and cargo are transported subject to certain requirements, such as a contract. However, current autonomous transportation systems, modes, and techniques do not provide for ensuring or validating that the integrity of the transported persons or cargo is maintained according to the stipulated requirements.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4B illustrates an intra-transportation attestation loop 400b of logic flow 400a.

DETAILED DESCRIPTION

In general, the present disclosure provides to attest to the state of cargo during transportation to validate transportation of the cargo adhered to specified requirements. Furthermore, the present disclosure provides for detection of breach of transportation requirements. Various embodiments can be provided to attest to that an autonomous vehicle (AV) is in a valid state and/or context to receive or deliver cargo. For example, the present disclosure can be provided to attest to such a condition based on sensors, in-vehicle network traffic, physical location, system load, and intrusion detection system signals. Further, the present disclosure can be provided to monitor, during transit, cargo to determine whether a breach of contract (e.g., time, place, location, route, temperature, cabin access, etc.) occurred. Additionally, the present disclosure can be provided evidence and/or indication of such a breach to a reporting agency (e.g., contract owner, cargo owner, compliance agency, etc.) responsive to detecting a breach.

In general, an autonomous vehicle (AV) can identify parameter states related to transportation of cargo, discretize the states, and generate a hash of the discretized states. This hash can be provided to stakeholders (e.g., interested entities) to attest to the integrity of cargo transportation. Additional (e.g., subsequent to the first, or the like) attestations can be made by again identifying parameter states, discretizing the states, and then generating a hash based on the prior hash and the current discretized states.

Furthermore, stakeholders can receive hashes comprising indications of discretized parameter states and can determine whether transportation of cargo adhered to terms of a contract or not. Stakeholders can send a control signal to the autonomous vehicle comprising an indication of how to proceed responsive to a determination that a breach in the transportation contract was made.

In the following description, numerous specific details such as processor and system configurations are set forth in order to provide a more thorough understanding of the described embodiments. However, the described embodiments may be practiced without such specific details. Additionally, some well-known structures, circuits, and the like have not been shown in detail, to avoid unnecessarily obscuring the described embodiments.

Figure 1:
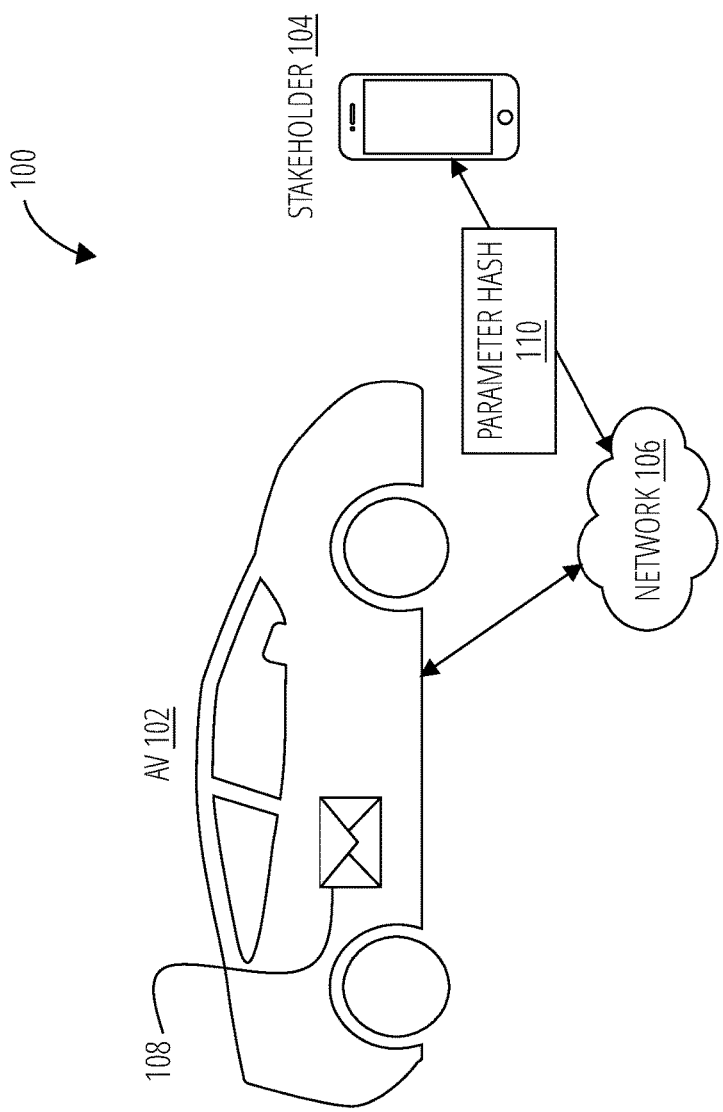
FIG. 1 illustrates an environment 100 for attesting to the integrity of cargo transported by an autonomous vehicle.

FIG. 1 illustrates an environment 100 including an autonomous vehicle 102, also referred to as an AV. The autonomous vehicle 102, as described further herein, is arranged to provide integrity monitoring an validation for cargo 108 (e.g., documents, goods, persons, etc.,) during transport. The autonomous vehicle 102 can verify the integrity of the cargo 108, at the beginning and end of the transport as well as during the transport and attest to the integrity to a stakeholder 104 via network 106. In general, stakeholder 104 can be any entity (e.g., person, business, service, etc.) with interest in the cargo 108 and/or transportation of the cargo 108.

In general, the autonomous vehicle 102 can be any transport machine. It is noted that a car is depicted in this and other figures herein. However, this is done for purposes of convenience and not to be limiting. That is, autonomous vehicle 102 could be another type of transport machine such as, a motorcycle, an airplane, a boat, or the like. Furthermore, although autonomous vehicle 102 is referred to herein as "autonomous," autonomous vehicle 102 need not be fully autonomous and may still include a driver and/or operator.

Stakeholder 104 can be any device operated, owned, controller, and/or provisioned by a stakeholder entity. For example, stakeholder 104 can be a mobile device as depicted. However, stakeholder 104 could be a server, a desktop, a laptop, a virtual machine, a software as a service platform, or the like.

Network 106 can be any network arranged to provide communication of messages, information elements, or data between autonomous vehicle 102 and stakeholder 104. Network 106 may include the Internet, a local area network (LAN), a wide area network (WAN), and/or other data network. Data may be communicated between autonomous vehicle 102 and stakeholder 104 via network 106 using data-networking protocols (e.g., HTTP, TCP/IP, RTP/RTSP, IPX, UDP, WiFi, NFC, Bluetooth, power-line communication (PLC), or the like). In some embodiments, the network 106 may also include a voice network that conveys not only voice communications, but also non-voice data such as Short Message Service (SMS) messages, as well as data communicated via various cellular data communication protocols, and the like.

Cargo 108 can be anything. A letter is depicted in this and other figures herein for purposes of clarity. However, this is not intended to be limiting and cargo 108 could be any item (e.g., documents, goods, persons, animals, etc.) with which autonomous vehicle 102 can transport.

In general, during operation, autonomous vehicle 102 can attest to the integrity of cargo 108 to stakeholder 104 by identifying parameter states related to transportation of cargo 108, discretize the parameter states, and generate a parameter hash 110 of the discretized parameter states. This parameter hash 110 can be provided to stakeholder 104 via network 106. Additional (e.g., subsequent to the first, or the like) attestations can be made by again identifying parameter states, discretizing the states, and then generating a new parameter hash 110 based on the prior parameter hash 110 (or parameter hashes 110) and the current discretized states. This new parameter hash 110 can again be provided to stakeholder 104 via network 106 to attest to the continued integrity of cargo 108.

Stakeholder 104 can receive parameter hashes 110 comprising indication of the integrity of transportation of the cargo 108. Stakeholder 104 can determine, based on the parameter hashes 110, whether transportation of the cargo 108 adhered to terms of a contract. Further, stakeholder 104 can send control signals (e.g., via network 106, or the like) to autonomous vehicle 102 comprising indication of actions to take response to a determination that a breach in the transportation contract was made. For example, stakeholder 104 can send a control signal to autonomous vehicle 102 comprising an indication to abort the transportation of cargo 108. As another example, stakeholder 104 can send a control signal to autonomous vehicle 102 comprising an indication to change a destination of the transportation of cargo 108.

Figure 2:
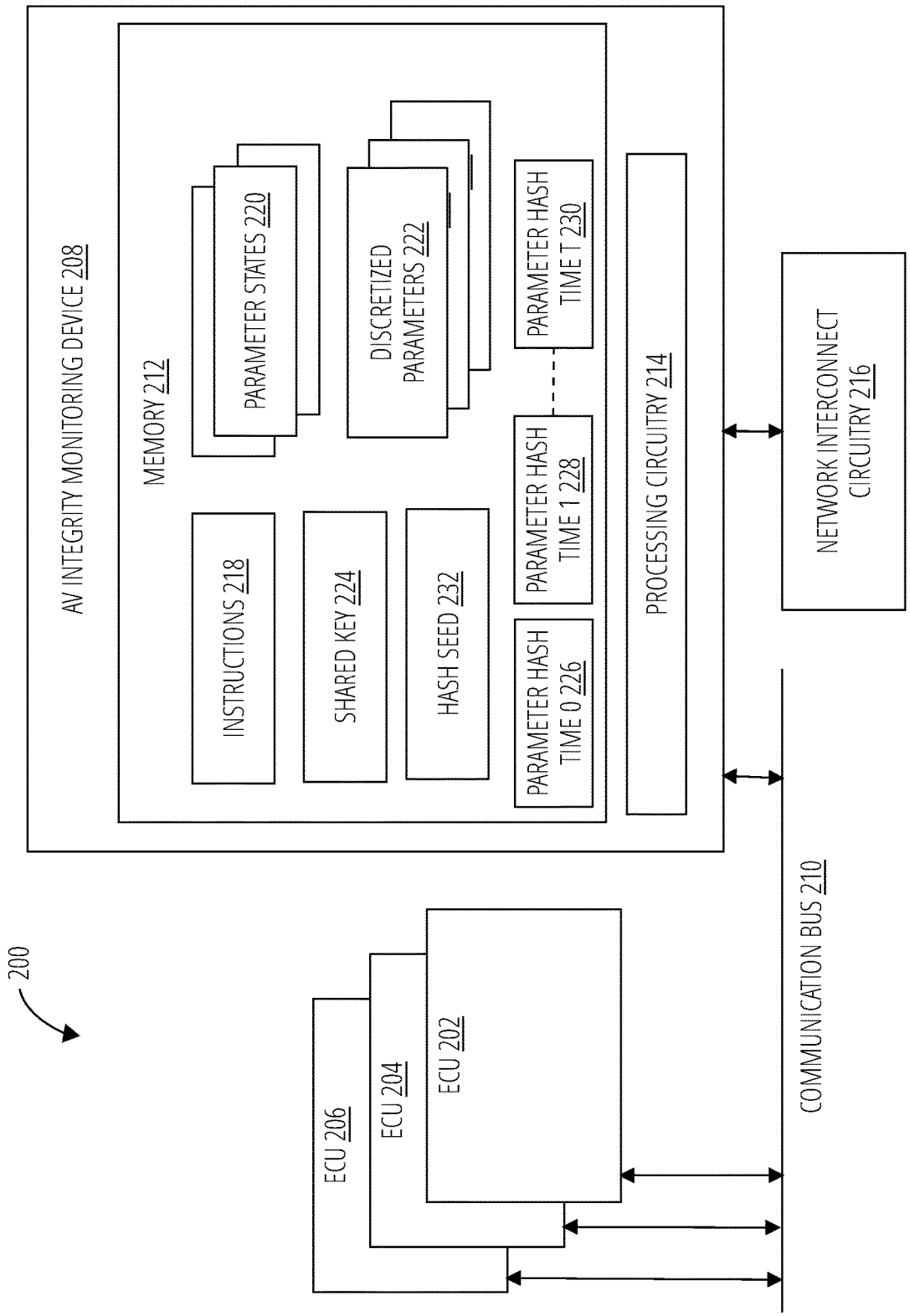
FIG. 2 illustrates a system 200 for an autonomous vehicle to attest to the integrity of transported cargo.

FIG. 2 illustrates an example system 200, which can be implemented in a transport machine, such as, autonomous vehicle 102 of environment 100 depicted in FIG. 1. System 200 includes a number of electronic control units (ECUs), for example, ECU 202, ECU 204, and ECU 206, an AV integrity monitoring device 208, and network interconnect circuitry 216. ECU 202, ECU 204, and ECU 206 are coupled to AV integrity monitoring device 208 via a communication bus 210. Communication bus 210 can be an in-vehicle network (IVN), such as, a CAN bus, a FlexRay bus, a CAN FD bus, an automotive ethernet bus, or a local interconnected network (LIN) bus. Additionally, where implemented in contexts outside of the automotive space, the communication bus 210 can be a network bus adapted to the particular implementation, such as, for example, a communication network for manufacturing equipment, or the like.

In general, each of ECU 202, ECU 204, and ECU 206 include circuitry arranged to generate messages and transmit the messages onto communication bus 210 and/or consume messages from communication bus 210. The depicted ECUs (e.g., ECU 202, ECU 204, and ECU 206) can be any of a variety of devices, such as, for example, sensor devices, actuator devices, microprocessor control devices, or the like. In particular examples, ECUs (e.g., ECU 202, ECU 204, and ECU 206) can be sensor and/or parameter monitoring devices (e.g., refer to FIG. 3A, FIG. 3B, and FIG. 3C) arranged to monitor parameter states related to transport of cargo (e.g. Transport of cargo 108 by autonomous vehicle 102, or the like) and provide indications of the parameter states to AV integrity monitoring device 208 via communication bus 210.

AV integrity monitoring device 208 includes memory 212, processing circuitry 214, and network interconnect circuitry 216. Memory 212 includes instructions 218 (e.g., firmware, or the like) that can be executed by processing circuitry 214. Memory 212 further includes parameter states 220, discretized parameters 222, shared key 224, parameter hash time 0 226, parameter hash time 1 228, and parameter hash time T 230. Furthermore, memory 212 may optionally include hash seed 232.

During operation, processing circuitry 214 can execute instructions 218 to identify parameter states 220 (e.g., based on messages received from ECUs (e.g., ECU 202, ECU 204, and/or ECU 206) and generate parameter hashes (e.g., parameter hash time 0 226, parameter hash time 1 228, and/or parameter hash time T 230) based on the parameter states 220 and shared key 224. In some examples, processing circuitry 214 can execute instructions 218 to generate parameter hashes based on the parameter states 220, shared key 224, and hash seed 232. With some examples, hash seed 232 can be received from a stakeholder (e.g., stakeholder 104, or the like).

Generation of parameter hashes is described in greater detail below. However, in general, parameter hashes can be generated at the start and end of a transport as well as at repeated intervals (e.g., on a fixed interval, upon request from a stakeholder, responsive to a condition, or the like). Processing circuitry 214, in executing instructions 218 to generate an initial parameter hash (e.g., parameter hash time 0 226), can discretize parameter states 220 to form discretized parameters 222 and generate a digest, or hash, comprising an indication of the discretized parameters 222. Processing circuitry 214, in executing instructions 218 to generate subsequent parameter hashes (e.g., parameter hash time 1 228, parameter hash time T 230, etc.) can discretize parameter states 220 and generate a digest, or hash, comprising an indication of the discretized parameters 222 chained with the discretized parameters 222 from prior parameter hashes. This provides a cryptographically secure digest. Furthermore, the present disclosure (e.g., parameter hashes as provided) provides that sending an entire list of parameter values can be avoided while still providing stakeholders knowledge of ranges within which the parameters fall.

Memory 212 can be based on any of a wide variety of information storage technologies. For example, memory 212 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 212 can include storage devices.

Processing circuitry 214 can include any of a variety of processors, such as, for example, commercial central processing units, application specific integrated circuits, or the like. Processing circuitry 214 can be a microprocessor or a commercial processor and can include one or multiple processing core(s) and can also include cache.

Network interconnect circuitry 216 can include any circuitry arranged to send and/or receive information elements (e.g., data, messages, parameter hashes, etc.) via a network. For example, network interconnect circuitry 216 can send parameter hash time 0 226, parameter hash time 1228, and/or parameter hash time T 230 to a stakeholder (e.g., stakeholder 104) via a network (e.g., network 106).

Figure 3A:
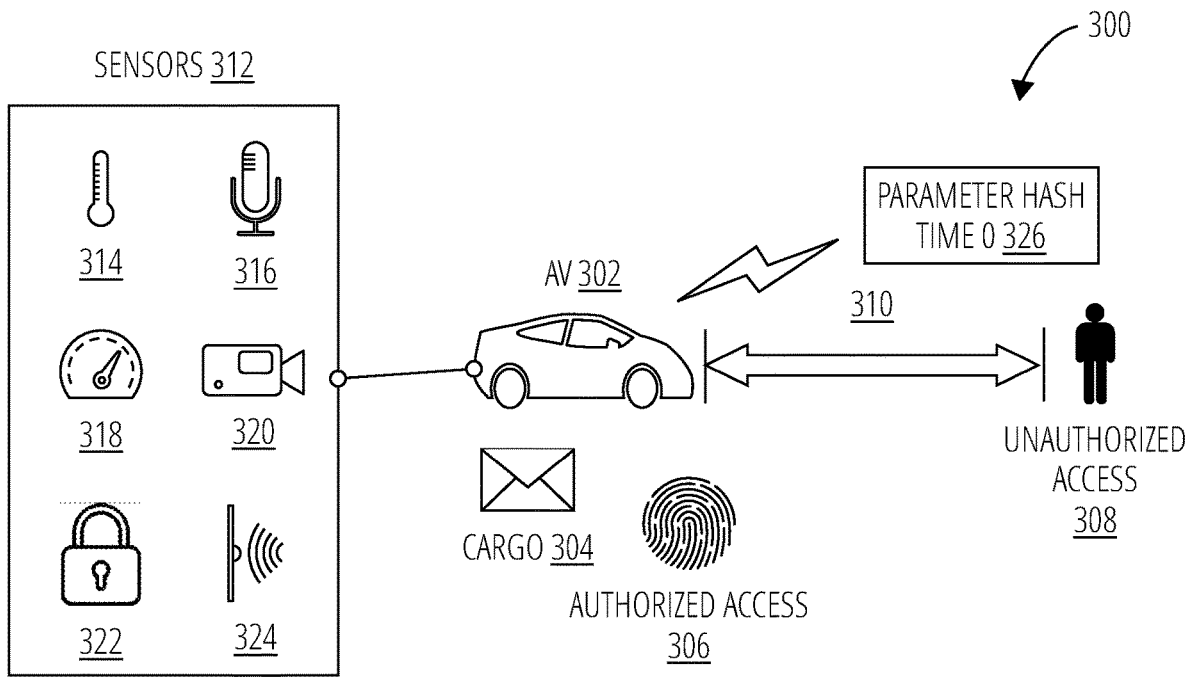
FIG. 3A illustrates an environment 300 at initiation of transportation of cargo in accordance with one embodiment.
Figure 3B:
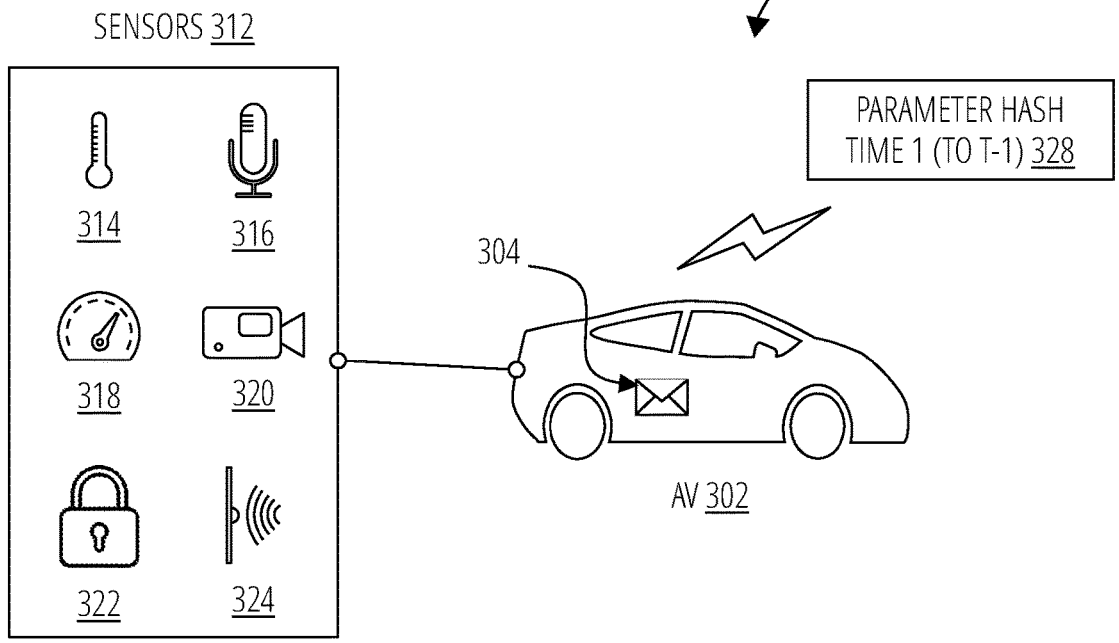
FIG. 3B illustrates the environment 300 during transportation of cargo in accordance with one embodiment.
Figure 3C:
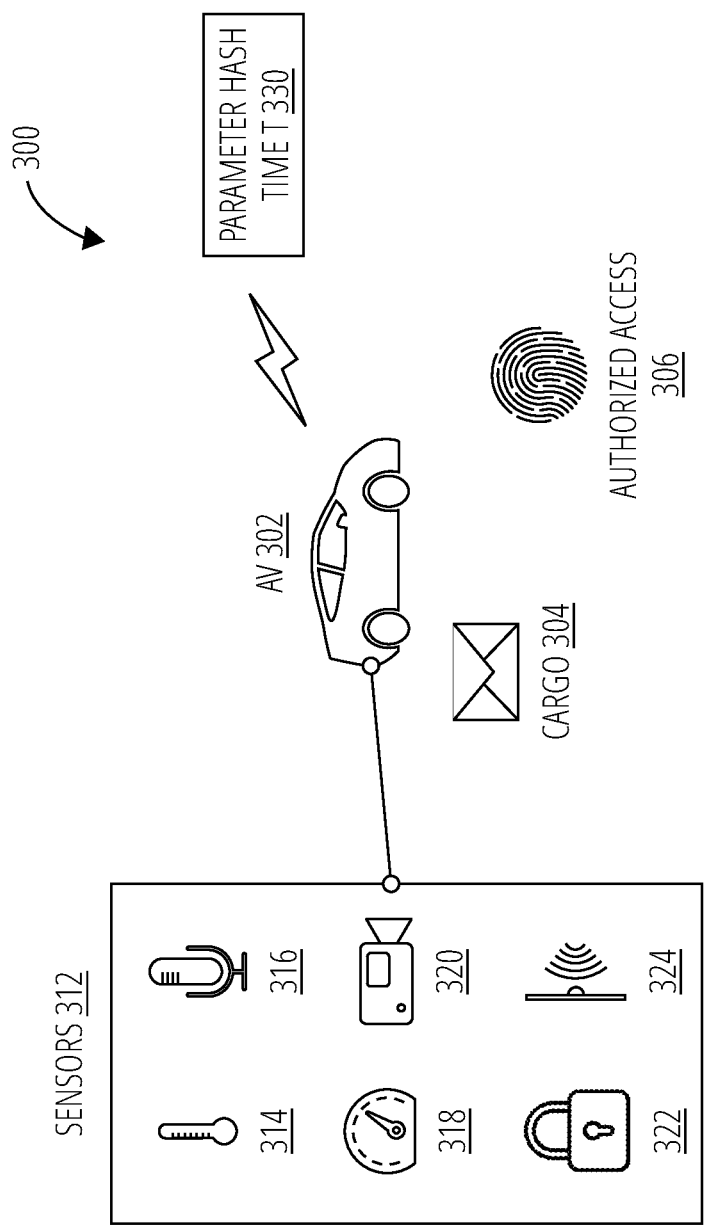
FIG. 3C illustrates the environment 300 at the conclusion of transportation of cargo in accordance with one embodiment.

FIG. 3A to FIG. 3C illustrate an environment in which an autonomous vehicle can attest to integrity of cargo during transport. It is noted that the environment depicted in these figures is shown for purposes of clarity of presentation and not to be limiting. For example, a specific autonomous transportation machine (e.g., car) and sensors (e.g., temperature, speed, etc.) are depicted and used in this example. However, the present disclosure is equally applicable to other autonomous transport machines (e.g., boats, airplanes, etc.) as well as other sensors. FIG. 3A illustrates environment 300 depicting an autonomous vehicle 302 at the initiation of transporting cargo 304. Said differently, this figure depicts environment 300 at time 0.

At time 0, autonomous vehicle 302 can receive cargo 304 and determine whether access to the cargo 304 is authorized or unauthorized. For example, this figure depicts an authorized access 306. Authorized access can be determined based on a variety of technologies, such as, for example, biometric (as depicted), facial recognition, keypad, etc. Furthermore, this figure depicts an unauthorized access 308. With some examples, cargo 304 can determine a distance 310 between the unauthorized access 308 and the cargo 304.

Furthermore, at time 0, autonomous vehicle 302 can receive parameter states (e.g., parameter states 220, or the like) from sensors 312. As noted, parameter states can comprise an indication of any state. For purposes of example, parameter states can include indications of states from sensors 312, which can include a temperature sensor 314, an audio sensor 316 (e.g., microphone, or the like), movement sensor 318 (e.g., speed-sensor, speedometer, GPS tracker, fall effect sensor, inertial measurement unit (IMU), etc.), images sensor 320 (e.g., still camera, video camera, etc.), vehicle cabin sensor 322 (e.g., door lock sensor, seat belt sensor, window position sensor, child safety lock sensor, moon/sunroof sensor, trunk sensor, airbag activation sensor, etc.), proximity sensor 324 (e.g., radar, LIDAR, etc.) With some examples, authorized access 306 and/or unauthorized access 308 as well as distance 310 can be determined based on parameter states from one or more of sensors 312 (e.g., images sensor 320 and/or proximity sensor 324, etc.). At time 0, autonomous vehicle 302 can generate parameter hash time 0 326 and send the parameter hash time 0 326 to a stakeholder (e.g., stakeholder 104, or the like) to attest to the integrity of cargo 304 at initiation of the transport.

FIG. 3B illustrates environment 300 depicting the autonomous vehicle 302 during transport of cargo 304. Said differently, this figure depicts environment 300 at time 1 to time T–1, where time 0 is initiation of the transportation of cargo 304 (e.g., depicted in FIG. 3A) and time T is conclusion of the transportation of cargo 304 (e.g., depicted in FIG. 3C). At time 1 to time T–1, autonomous vehicle 302 can repeatedly attest to the integrity of cargo 304 during transport. It is noted that the frequency with which autonomous vehicle 302 attests to the integrity of cargo 304 may depend on the implementation and can be based on a periodic frequency, triggered based on a condition (e.g., miles transported, unauthorized party detected, etc.), and/or as requested by a stakeholder.

At time 1 to time T–1, autonomous vehicle 302 can receive parameter states (e.g., parameter states 220, or the like) from sensors 312. Autonomous vehicle 302 can generate parameter hash time 1 (to T–1) 328 and send the parameter hash time 1 (to T–1) 328 to a stakeholder (e.g., stakeholder 104, or the like) to attest to the integrity of cargo 304 during transport.

FIG. 3C illustrates environment 300 depicting an autonomous vehicle 302 at the conclusion of transporting cargo 304. Said differently, this figure depicts environment 300 at time T.

At time T, autonomous vehicle 302 can identify an authorized access 306 and release cargo 304 responsive to the authorized access 306. Additionally, at time T, autonomous vehicle 302 can again receive parameter states (e.g., parameter states 220, or the like) from sensors 312 and autonomous vehicle 302 can generate parameter hash time T 330 and send the parameter hash time T 330 to a stakeholder (e.g., stakeholder 104, or the like) to attest to the integrity of cargo 304 at the conclusion of the transport.

Figure 4A:
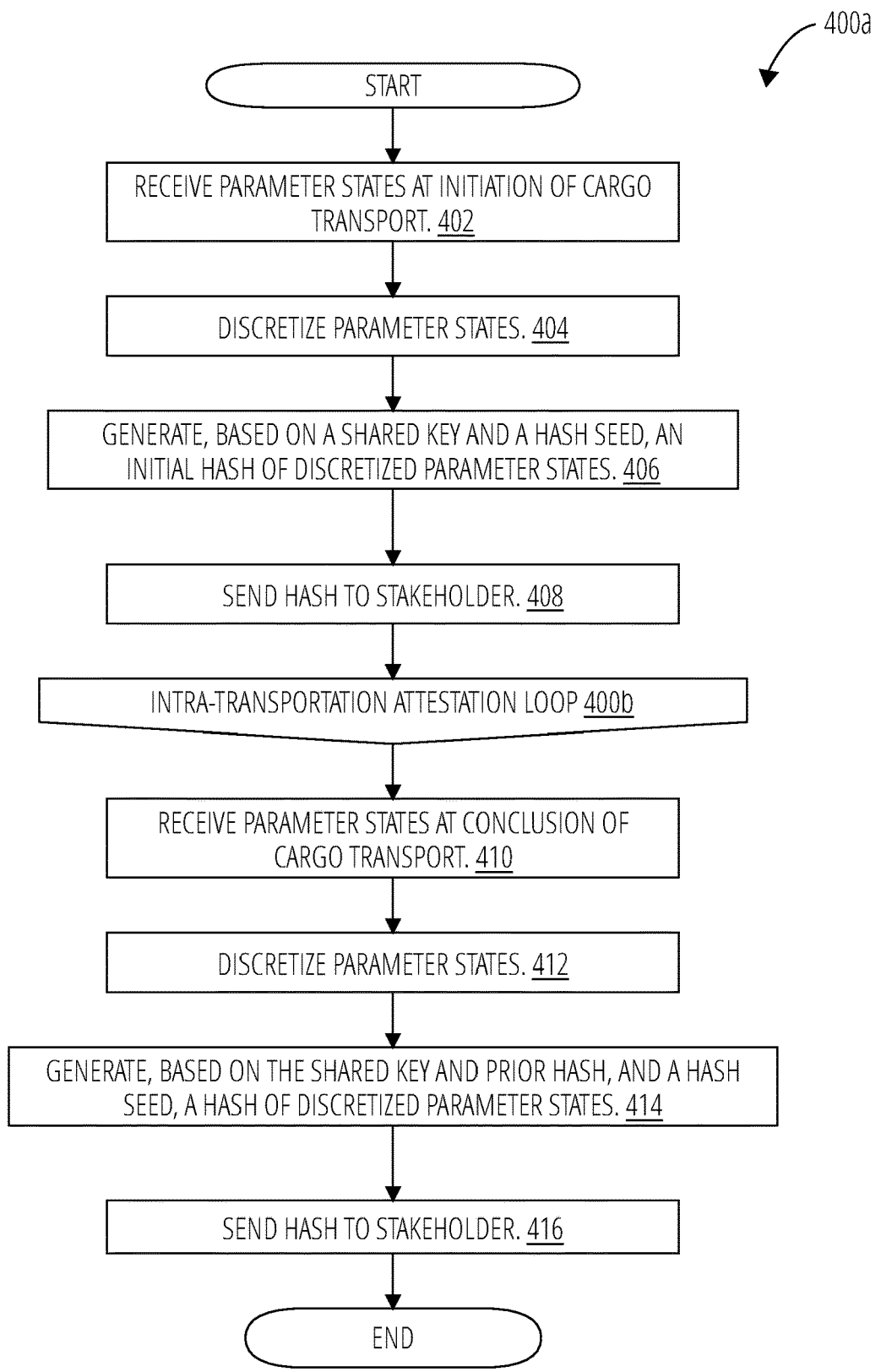
FIG. 4A illustrates a logic flow 400a to attest to the integrity of cargo transported by an autonomous vehicle.
Figure 4B:
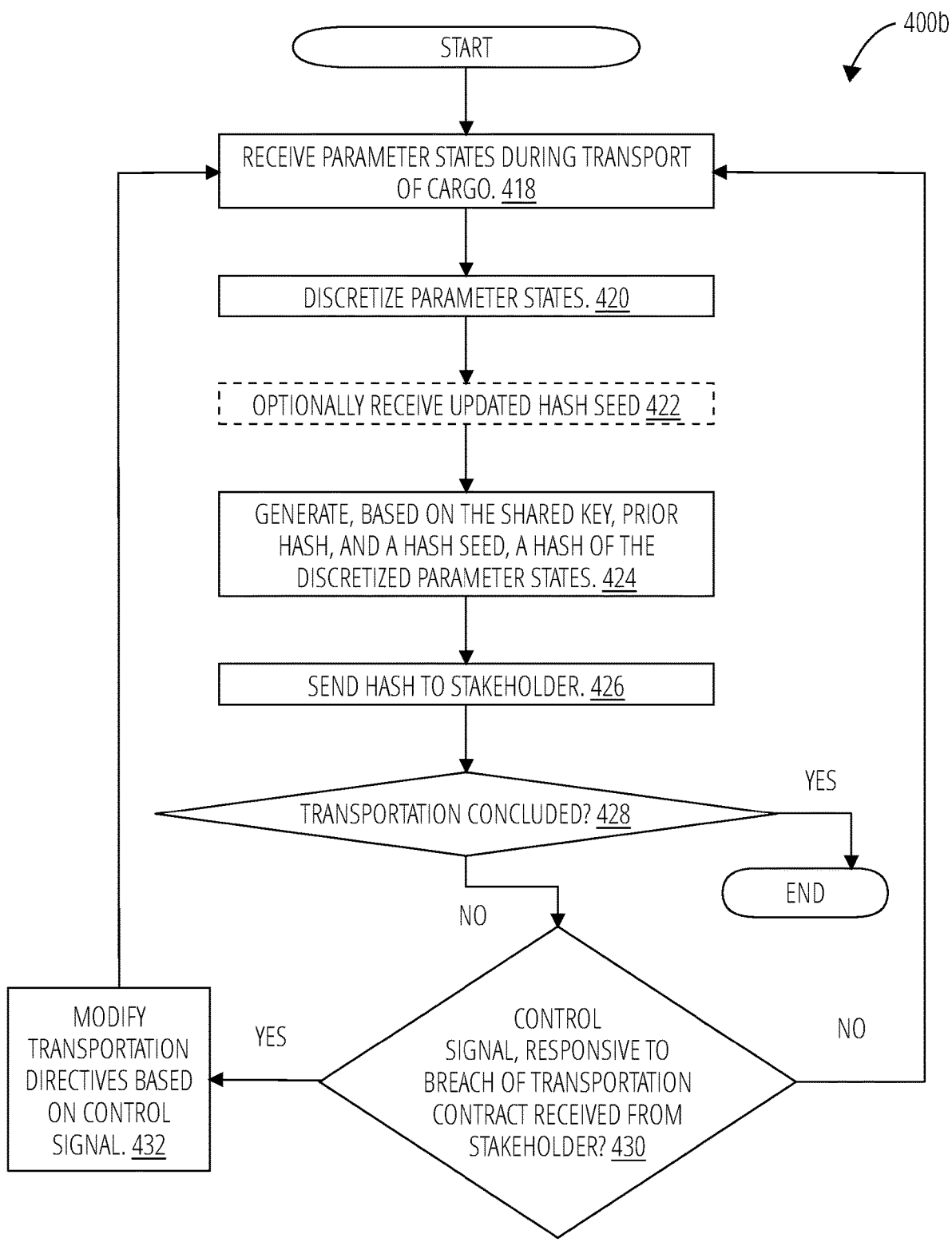

FIG. 4A and FIG. 4B depict logic flow 400a. Logic flow 400a can be implemented by an autonomous vehicle, such as autonomous vehicle 102 and/or autonomous vehicle 302 depicted and described elsewhere herein. As a specific example, system 200 (and particularly AV integrity monitoring device 208 of system 200) can implement logic flow 400a to attest to the integrity of transported cargo. Logic flow 400a includes an intra-transportation attestation loop 400b, which is depicted on FIG. 4B. In general, logic flow 400a includes blocks 402 through 408 that correspond to generating a hash to attest to the integrity of cargo at initiation of transportation, intra-transportation attestation loop 400b to generate a hash to attest to the integrity of cargo during transportation of cargo, and blocks 410 through 416 that correspond to generating a hash to attest to the integrity of cargo at the conclusion of transportation.

The logic flows described herein, including logic flow 400a and intra-transportation attestation loop 400b, as well as other logic flows described herein, are representative of exemplary methodologies for performing novel aspects of the disclosed architecture. While, for purposes of simplicity of explanation, the one or more methodologies shown herein, for example, in the form of a flow chart or flow diagram, are shown and described as a series of acts, it is to be understood and appreciated that the methodologies are not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all acts illustrated in a methodology may be required for a novel implementation.

Turning more specifically to FIG. 4A, logic flow 400a may begin at block 402. At block 402 "receive parameter states at initiation of cargo transport" processing circuitry can receive parameter states at the initiation of transportation of cargo. For example, processing circuitry 214 of AV integrity monitoring device 208, in executing instructions 218, can receive parameter states 220 from sensors (e.g., ECU 202, ECU 204, ECU 206, and/or the like). Continuing to block 404 "discretize parameter states" processing circuitry can discretize the parameter states. For example, processing circuitry 214 can execute instructions 218 to generate discretized parameters 222 from parameter states 220. In general, parameter states can be discretized by transferring continuous variables to discrete buckets or ranges of values. For example, where speed S is a parameter in miles per hour (MPH), the continuous speed variable S can be discretized into the following example buckets [1: S<1 MPH, 2: 1<S≤20 MPH, 3: 20<S≤30 MPH, 4: 30<S≤40 MPH, 5: 40<S≤50 MPH, 6: 50<S≤60 MPH, 7: S>60 MPH]. It is noted that is merely an example. Other examples could include discretization into fewer or more buckets (e.g., if the target speed for transportation is between 25 MPH and 65 MPH then the speed could be discretized into binary values. Using this example, the speed parameter could be discretized to 0 where 25>S>MPH and 1 where 25 MPH≤S≤65 MPH.

As another example, identification of unauthorized parties could be discretized into buckets based on the number of unauthorized parties, the distance between the AV and the unauthorized parties, etc. Still further other parameters could be discretized such as, temperature, volume level within the AV, or the like.

Continuing to block 406 "generate, based on a shared key and a hash seed, an initial hash of discretized parameter states" processing circuitry can generate a hash of the discretized parameter states using a shared key and a, optionally, a hash seed. For example, processing circuitry 214, in executing instructions 218 can generate parameter hash time 0 226 from discretized parameters 222, shared key 224, and hash seed 232. As a specific example, processing circuitry 214, in executing instructions 218 can generate parameter hash time 0 226 ($H^0$) based on the following equation: $H^0=(H^0_0, H^0_1, H^0_2, \ldots, H^0_n)$ where $H^0_n$ is the hash of the discretized parameter P (e.g., discretized speed, discretized temperature, etc.) given by the following equation: $H^0_n=\text{HashFunction}(H^0_0, P^0_0)$ where $S^0$ is the hash seed at time 0 and $P^0_n$ is the discretized parameter n at time 0. In general, the hash can be generated using any of a variety of cryptographic keyed hash functions, such as, for example, hash based message authentication code (HMAC), or the like.

Continuing to block 408 "send hash to stakeholder" processing circuitry can send the hash to stakeholder(s). For example, processing circuitry 214 in executing instructions 218 can send parameter hash time 0 226 to stakeholder 104 via network interconnect circuitry 216 and network 106.

From block 408, logic flow 400a can continuing to intra-transportation attestation loop 400b to generate hashes to attest to the integrity of cargo during transport. Turning more specifically to FIG. 4B and intra-transportation attestation loop 400b, the logic flow can continue to block 418 "receive parameter states during transport of cargo" processing circuitry can receive parameter states during transportation of cargo. For example, processing circuitry 214 of AV integrity monitoring device 208, in executing instructions 218, can receive parameter states 220 from sensors (e.g., ECU 202, ECU 204, ECU 206, and/or the like). Continuing to block 420 "discretize parameter states" processing circuitry can discretize the parameter states. For example, processing circuitry 214 can execute instructions 218 to generate discretized parameters 222 from parameter states 220. In general, parameter states can be discretized by transferring continuous variables to discrete buckets or ranges of values. Intra-transportation attestation loop 400b can optionally, include block 422 "optionally receive updated hash seed" processing circuitry can receive an updated hash seed 232. Continuing to block 424 "generate, based on the shared key, prior hash and a hash seed, a hash of the discretized parameter states" processing circuitry can generate a hash of the discretized parameter states for a time between 0 and T (e.g., during transportation of the cargo). In general, processing circuitry generates a "parameter hash time t", which refers to the digest of cryptographic keyed hash function at a given moment (i.e., time t), calculated over a set of parameters, seeds, other digests, etc.

For example, processing circuitry 214, in executing instructions 218 can generate parameter hash time 1 228 from discretized parameters 222, shared key 224, and hash seed 232. As a specific example, processing circuitry 214, in executing instructions 218 can generate parameter hash time 1 228 ($H^1$) based on the following equation: $H^T=(H^T_0, H^T_1, H^T_2, \ldots, H^T_n)$, where $H^T_n$ is the hash of the discretized parameter P (e.g., discretized speed, discretized temperature, etc.) at time T, given by the following equation: $H^T_n=\text{HashFunction}(H^{T-1}_n, S^T, P^T_n)$ where $S^T$ is the hash seed at time T and $P^T_n$ is the discretized parameter n at time T and $H^{T-1}_n$ is the hash value of the parameter from the prior time period. In general, as noted above, the hash can be generated using any of a variety of cryptographic hashing functions.

Continuing to block 426 "send hash to stakeholder" processing circuitry can send the hash to stakeholder(s). For example, processing circuitry 214 in executing instructions 218 can send parameter hash time 0 226 to stakeholder 104 via network interconnect circuitry 216 and network 106.

Continuing to decision block 428 "transportation concluded?" processing circuitry can determine whether the transportation of cargo has concluded. For example, processing circuitry 214 in executing instructions 218 can determine whether transportation of cargo 108 (e.g., via autonomous vehicle 102 or the like) has concluded. From decision block 428, intra-transportation attestation loop 400b can proceed to either decision block 430 or end. In particular, intra-transportation attestation loop 400b can proceed from decision block 428 to decision block 430 based on a determination at decision block 428 that the transportation has not concluded. However, intra-transportation attestation loop 400b can return (e.g., end) to logic flow 400a from decision block 428 based on a determination that the transportation has concluded.

At decision block 430 "control signal, responsive to breach of transportation contract received from stakeholder?" processing circuitry can determine whether a control signal from the stakeholder has been received. For example, processing circuitry 214 in executing instructions 218 can determine whether a control signal from a stakeholder (e.g., stakeholder 104, or the like) has been received. As will be described in greater detail below, a stakeholder 104 can send a control signal to autonomous vehicle 102 responsive to determining that the transportation of cargo 108 has deviated from required (e.g., contracted, etc.) parameters. From decision block 430, intra-transportation attestation loop 400b can return to block 418 or can proceed to block 432. For example, intra-transportation attestation loop 400b can return to block 418 from decision block 430 based on a determination that a control signal from the stakeholder has not been received, while intra-transportation attestation loop 400b can continue to block 432 from decision block 430 based on a determination that a control signal from the stakeholder has been received.

At block 432 "modify transportation directives based on control signal" processing circuitry can modify transportation directives based on the control signal. For example, the control signal may indicate a change to the transportation route, a change to the desired temperature inside the AV, or the like. From block 432, intra-transportation attestation loop 400b can return to block 418.

Returning to FIG. 4A and logic flow 400a, from intra-transportation attestation loop 400b, logic flow 400a can continue to block 410 "receive parameter states at conclusion of cargo transport" processing circuitry can receive parameter states at the conclusion of transportation of cargo. For example, processing circuitry 214 of AV integrity monitoring device 208, in executing instructions 218, can receive parameter states 220 from sensors (e.g., ECU 202, ECU 204, ECU 206, and/or the like). Continuing to block 412 "discretize parameter states" processing circuitry can discretize the parameter states. For example, processing circuitry 214 can execute instructions 218 to generate discretized parameters 222 from parameter states 220. In general, parameter states can be discretized by transferring continuous variables to discrete buckets or ranges of values. Continuing to block 414 "generate, based on the shared key, prior hash and a hash seed, a hash of the discretized parameter states" processing circuitry can generate a hash of the discretized parameter states for time T (e.g., during transportation of the cargo).

For example, processing circuitry 214, in executing instructions 218 can generate parameter hash time T 230 from discretized parameters 222, shared key 224, and hash seed 232. As a specific example, processing circuitry 214, in executing instructions 218 can generate parameter hash time T 230 based on the equations detailed above. Continuing to block 416 "send hash to stakeholder" processing circuitry can send the hash to stakeholder(s). For example, processing circuitry 214 in executing instructions 218 can send parameter hash time 0 226 to stakeholder 104 via network interconnect circuitry 216 and network 106.

Figure 5:
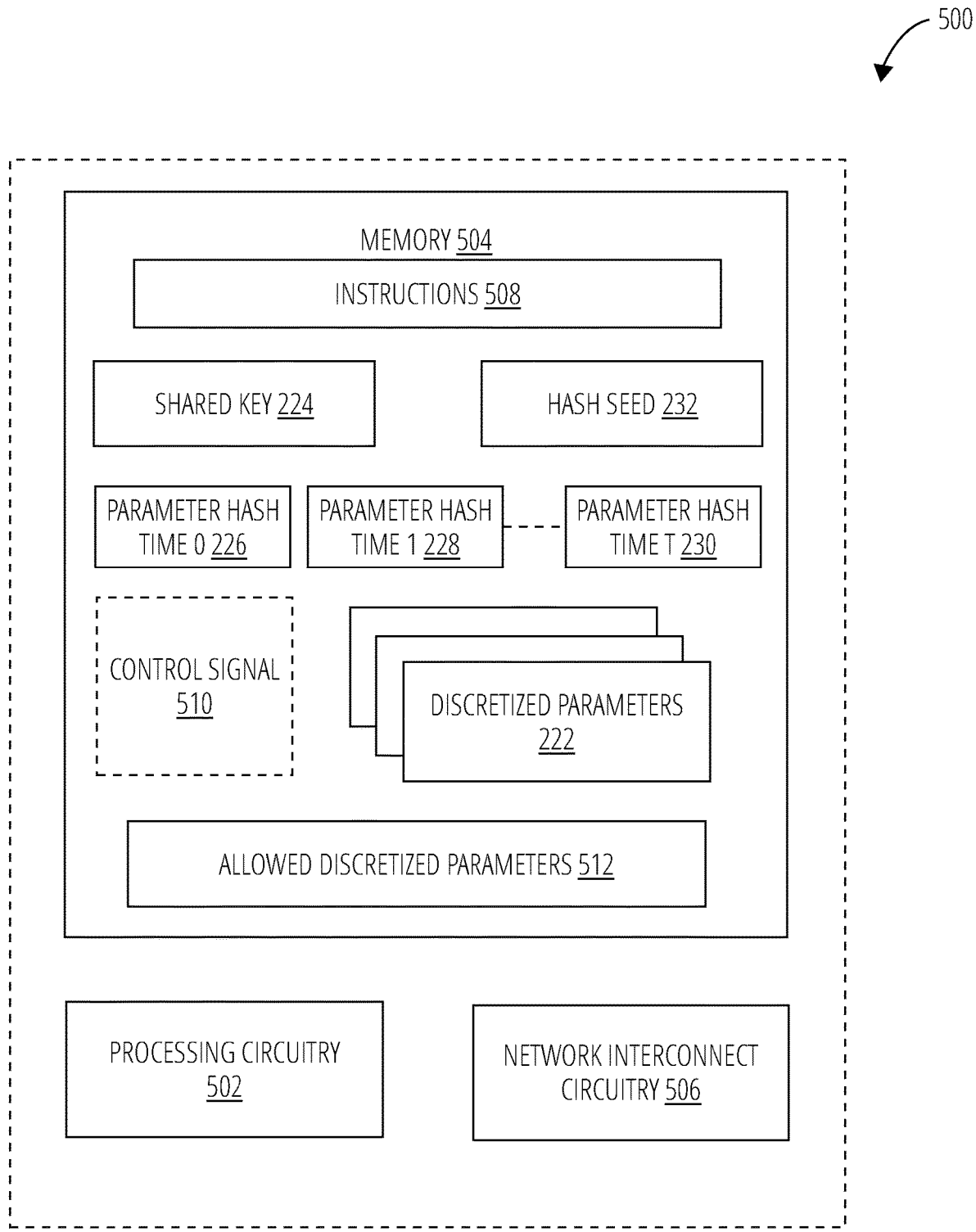
FIG. 5 illustrates a stakeholder device 500 to verify the integrity of cargo transported by an autonomous vehicle.

FIG. 5 illustrates an example stakeholder device 500, which can be implemented by a computing device, by a software as a service (SaaS), by a cloud based computing device, or the like. Stakeholder device 500 includes processing circuitry 502, memory 504, and network interconnect circuitry 506. Memory 504 can include instructions 508, discretized parameters 222, shared key 224, hash seed 232, parameter hash time 0 226, parameter hash time 1228, parameter hash time T 230, allowed discretized parameters 512, and optionally, control signal 510.

During operation, processing circuitry 502 can execute instructions 508 to monitor the integrity or cargo (e.g., cargo 108) being transported by an AV (e.g., autonomous vehicle 102). For example, processing circuitry 502 can execute instructions 508 to receive a parameter hash from an AV (e.g., parameter hash time 0 226, parameter hash time 1 228, parameter hash time T 230, or the like) via network interconnect circuitry 506 and a network (e.g., network 106). Additionally, processing circuitry 502 can execute instructions 508 to verify parameters (e.g., parameter states 220) are within range from the parameter hashes. Said differently, processing circuitry 502 can execute instructions 508 to verify the integrity of cargo 108 from the discretized parameters 222.

As detailed above, a parameter hash $H^T$ can be generated from the following equation $H^T=(H^T_0, H^T_1, H^T_2, \ldots, H^T_n)$. It is important to note that the stakeholder device 500 does not need to know (e.g., receive) the actual parameters as the stakeholder knows what discretized parameters 222 can take. Said differently, the number of buckets or partitions with this each discretized parameter can take is finite. As such, a limited number of keyed hashes need to be computed. Processing circuitry 502 can execute instructions 508 to derive keyed hashes for values with which the discretized parameters 222 can take. Once the derived hash matches the received hash (e.g., parameter hash time 0 226, parameter hash time 1 228, parameter hash time T 230, etc.) the parameter is known. With some examples, processing circuitry 502 can execute instructions 508 to derive the keyed hashes by loading the prior hash (e.g., $H^{T-1}_1$ when computing $H^T_1$) and just derive the tail of the operation. Once all $H^T_p$ are known, then verification between the chain can be derived as from the equation for the hash.

Additionally, processing circuitry 502 can execute instructions 508 to determine whether parameters are outside those allowed for the transportation of cargo 108 and can send a control signal to the AV (autonomous vehicle 102, or the like) comprising an indication of how to proceed responsive to the breach in transportation protocol.

Processing circuitry 502 can include any of a variety of processors, such as, for example, commercial central processing units, application specific integrated circuits, or the like. Processing circuitry 502 can be a microprocessor or a commercial processor and can include one or multiple processing core(s) and can also include cache.

Memory 504 can be based on any of a wide variety of information storage technologies. For example, memory 504 can be based on volatile technologies requiring the uninterrupted provision of electric power or non-volatile technologies that do not require and possibly including technologies entailing the use of machine-readable storage media that may or may not be removable. Thus, each of these storages may include any of a wide variety of types (or combination of types) of storage devices, including without limitation, read-only memory (ROM), random-access memory (RAM), dynamic RAM (DRAM), Double-Data-Rate DRAM (DDR-DRAM), synchronous DRAM (SDRAM), static RAM (SRAM), programmable ROM (PROM), erasable programmable ROM (EPROM), electrically erasable programmable ROM (EEPROM), flash memory, polymer memory (e.g., ferroelectric polymer memory), ovonic memory, phase change or ferroelectric memory, silicon-oxide-nitride-oxide-silicon (SONOS) memory, magnetic or optical cards, one or more individual ferromagnetic disk drives, or a plurality of storage devices organized into one or more arrays (e.g., multiple ferromagnetic disk drives organized into a Redundant Array of Independent Disks array, or RAID array). Additionally, memory 504 can include storage devices.

Network interconnect circuitry 506 can include any circuitry arranged to send and/or receive information elements (e.g., data, messages, parameter hashes, etc.) via a network. For example, network interconnect circuitry 506 can receive parameter hash time 0 226, parameter hash time 1228, and/or parameter hash time T 230 from an AV (e.g., autonomous vehicle 102, or the like) via a network (e.g., network 106).

Figure 6:
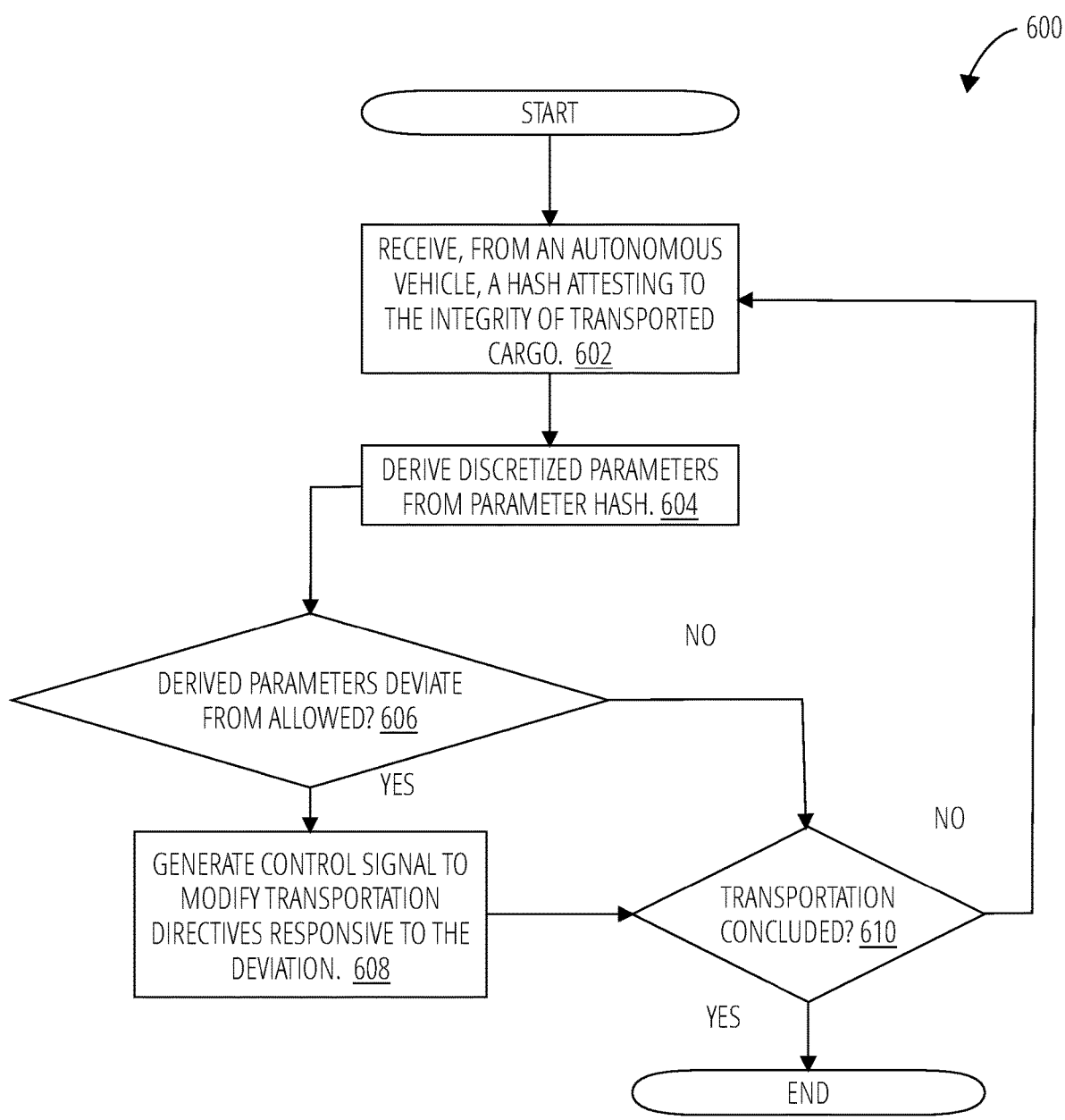
FIG. 6 illustrates a logic flow 600 to verify the integrity of cargo transported by an autonomous vehicle.

FIG. 6 depicts a logic flow 600. Logic flow 600 can be implemented by a stakeholder (e.g., stakeholder 104, stakeholder device 500, etc.) Logic flow 600 may begin at block 602. At block 602 "receive, from an autonomous vehicle, a hash attesting to the integrity of transported cargo" processing circuitry can receive a hash of parameters attesting to the integrity of cargo transported by an AV. For example, processing circuitry 502 in executing instructions 508 can receive (e.g., via network interconnect circuitry 506 and network 106) parameter hashes (e.g., parameter hash time 0 226, parameter hash time 1228, parameter hash time T 230, etc.).

Continuing to block 604 "derive discretized parameters from parameter hash" processing circuitry can derive discretized parameters from the parameter hash. For example, processing circuitry 502 can execute instructions 508 to derive discretized parameters 222 from a parameter hash (e.g., parameter hash time 0 226, parameter hash time 1 228, parameter hash time T 230, or the like). Continuing to decision block 606 "derived parameters deviate from expected?" processing circuitry can determine whether the derived discretized parameters deviate from the allowed discretized parameters. For example, processing circuitry 502 can execute instructions 508 to determine whether discretized parameters 222 (e.g., as derived based on the received parameter hash) deviated from allowed discretized parameters 512.

From decision block 606, logic flow 600 can continue to either block 608 or decision block 610. In particular, logic flow 600 can continue from decision block 606 to block 608 based on a determination that the discretized parameters 222 do deviate from the allowed discretized parameters 512 while logic flow 600 can continue from decision block 606 to decision block 610 based on a determination that the discretized parameters 222 do not deviate from the allowed discretized parameters 512.

At block 608 "generate control signal to modify transportation directives responsive to the deviation" processing circuitry can generate a control signal to include an indication to modify the transportation directives responsive to the deviation between the allowed discretized parameters 512 and the discretized parameters 222. For example, in some instances, processing circuitry 502 can execute instructions 508 to generate a control signal including an indication to abort or terminate the transportation of cargo 108. As another example, processing circuitry 502 can execute instructions 508 to generate a control signal including an indication to change a drop or location for cargo 108. With still another example, processing circuitry 502 can execute instructions 508 to generate a control signal including an indication to change a parameter (e.g., maximum speed, temperature, etc.) associated with transportation of the cargo 108.

At decision block 610 "transportation concluded" processing circuitry can determine whether transportation of the cargo has concluded. From decision block 610, logic flow 600 can end or return to block 602. More particularly, logic flow 600 can end based on a determination at decision block 610 that transportation of the cargo has concluded while logic flow 600 can return to block 602 based on a determination at decision block 610 that transportation has not concluded.

Figure 7:
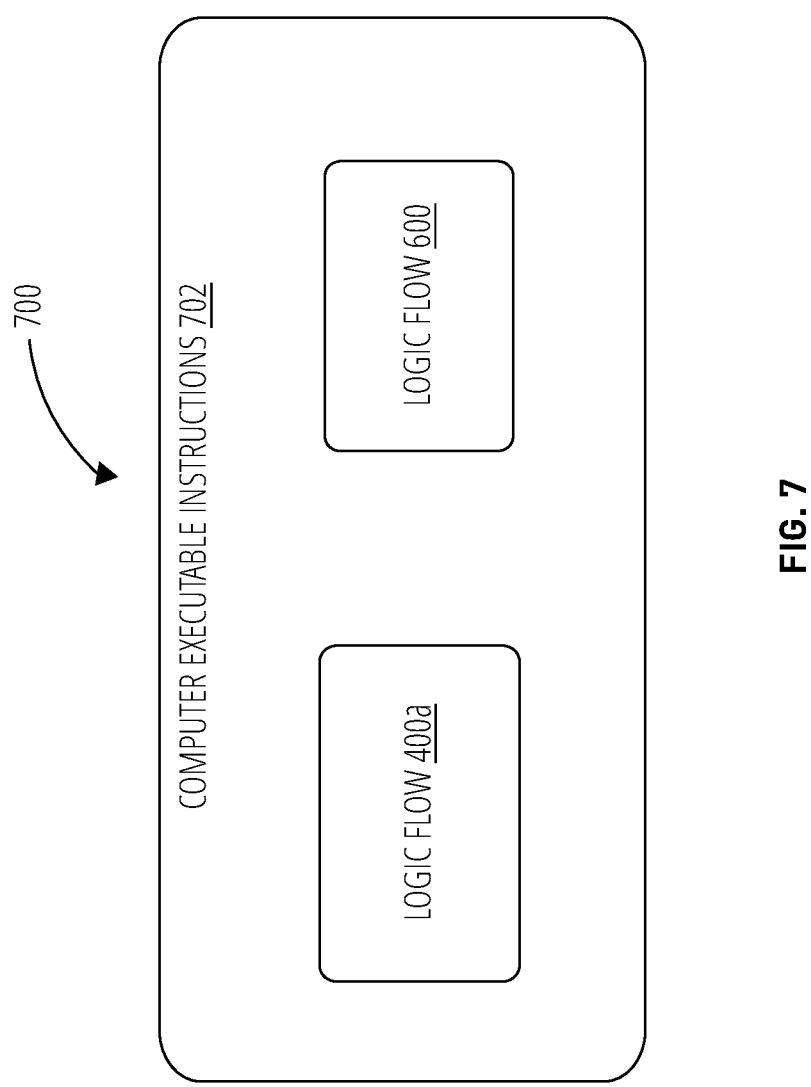
FIG. 7 illustrates a storage device 700 in accordance with one embodiment.

FIG. 7 illustrates an example of a storage device 700. Storage device 700 may comprise an article of manufacture, such as, any non-transitory computer readable medium or machine readable medium, such as an optical, magnetic or semiconductor storage. Storage device 700 may store various types of computer executable instructions 702, such as instructions to implement logic flow 400*a* (including intra-transportation attestation loop 400*b*) or logic flow 600. Examples of a computer readable or machine readable storage medium may include any tangible media capable of storing electronic data, including volatile memory or non-volatile memory, removable or non-removable memory, erasable or non-erasable memory, writeable or re-writeable memory, and so forth. Examples of computer executable instructions may include any suitable type of code, such as source code, compiled code, interpreted code, executable code, static code, dynamic code, object-oriented code, visual code, and the like. The examples are not limited in this context.

Figure 8:
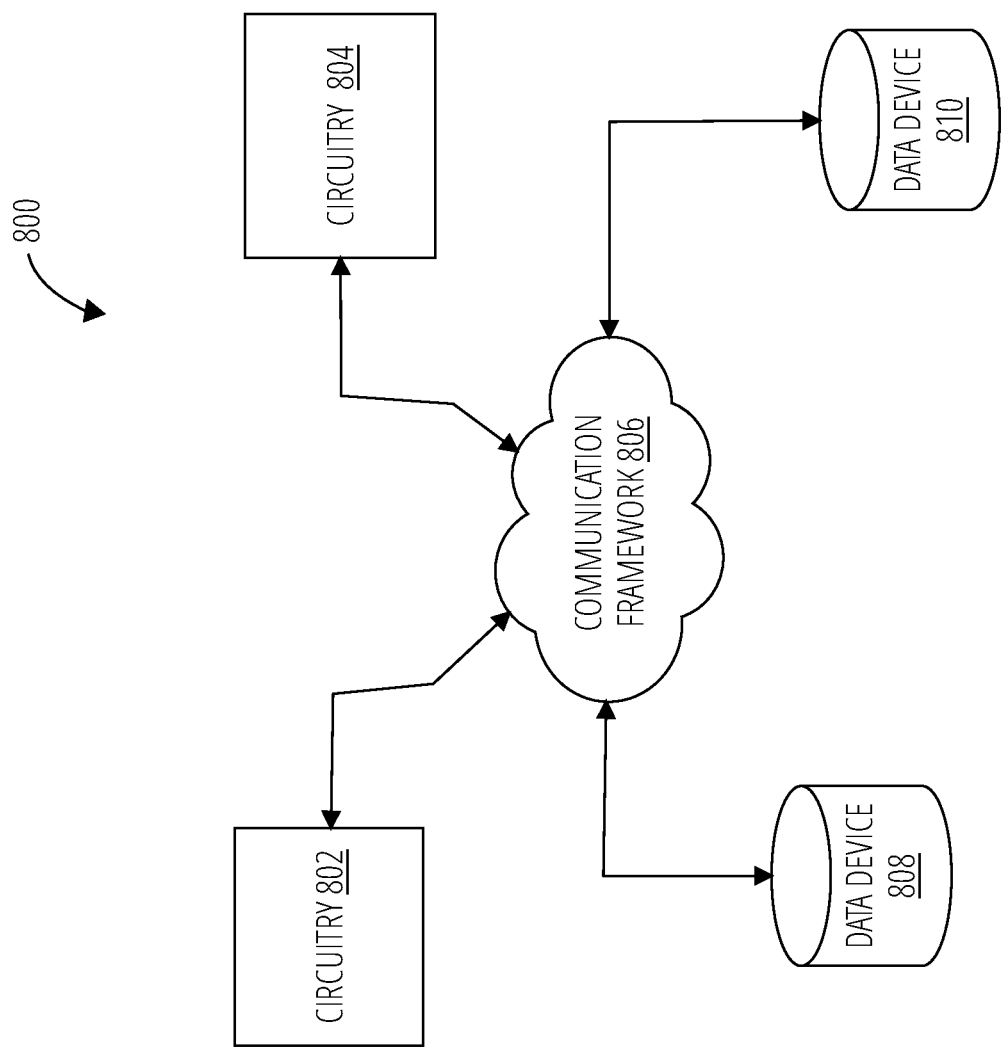
FIG. 8 illustrates an in-vehicle communication architecture 800 in accordance with one embodiment.

FIG. 8 illustrates an in-vehicle communication architecture 800 according to one or more embodiments of the disclosure. For example, one or more vehicular devices, components, or circuits, such as circuitry 802 and/or circuitry 804, may communicate with each other via a communications communication framework 806, which may be an in-vehicle network, such as a CAN bus, implemented to facilitate fingerprinting of ECUs as described above.

The in-vehicle communication architecture 800 includes various common communications elements, such as a transmitter, receiver, transceiver, and so forth. The embodiments, however, are not limited to implementation by the in-vehicle communication architecture 800. As shown in this figure, the vehicular circuitry 802 and circuitry 804 may each be operatively connected to one or more respective data devices, such as, data device 808 and/or data device 810 that can be employed to store information local to the respective circuitry 802 and/or circuitry 804, such as parameters, discretized parameters, hashes, or the like. It may be understood that the circuitry 802 and circuitry 804 may be any suitable vehicular component, such as sensor, an ECU, microcontroller, microprocessor, processor, ASIC, field programmable gate array (FPGA), any electronic device, computing device, or the like. Moreover, it may be understood that one or more computing devices (containing at least a processor, memory, interfaces, etc.) may be connected to the communication framework 806 in a vehicle.

Further, the communication framework 806 may implement any well-known communications techniques and protocols. As described above, the communication framework 806 may be implemented as a CAN bus protocol or any other suitable in-vehicle communication protocol. The communication framework 806 may also implement various network interfaces arranged to accept, communicate, and connect to one or more external communications networks (e.g., Internet). A network interface may be regarded as a specialized form of an input/output (I/O) interface. Network interfaces may employ connection protocols including without limitation direct connect, Ethernet (e.g., thick, thin, twisted pair 10/100/1000 Base T, and the like), token ring, wireless network interfaces, cellular network interfaces, IEEE 802.7a-x network interfaces, IEEE 802.16 network interfaces, IEEE 802.20 network interfaces, and the like. Further, multiple network interfaces may be used to engage with various communications network types. The communication framework 806 may employ both wired and wireless connections.

Figure 9:
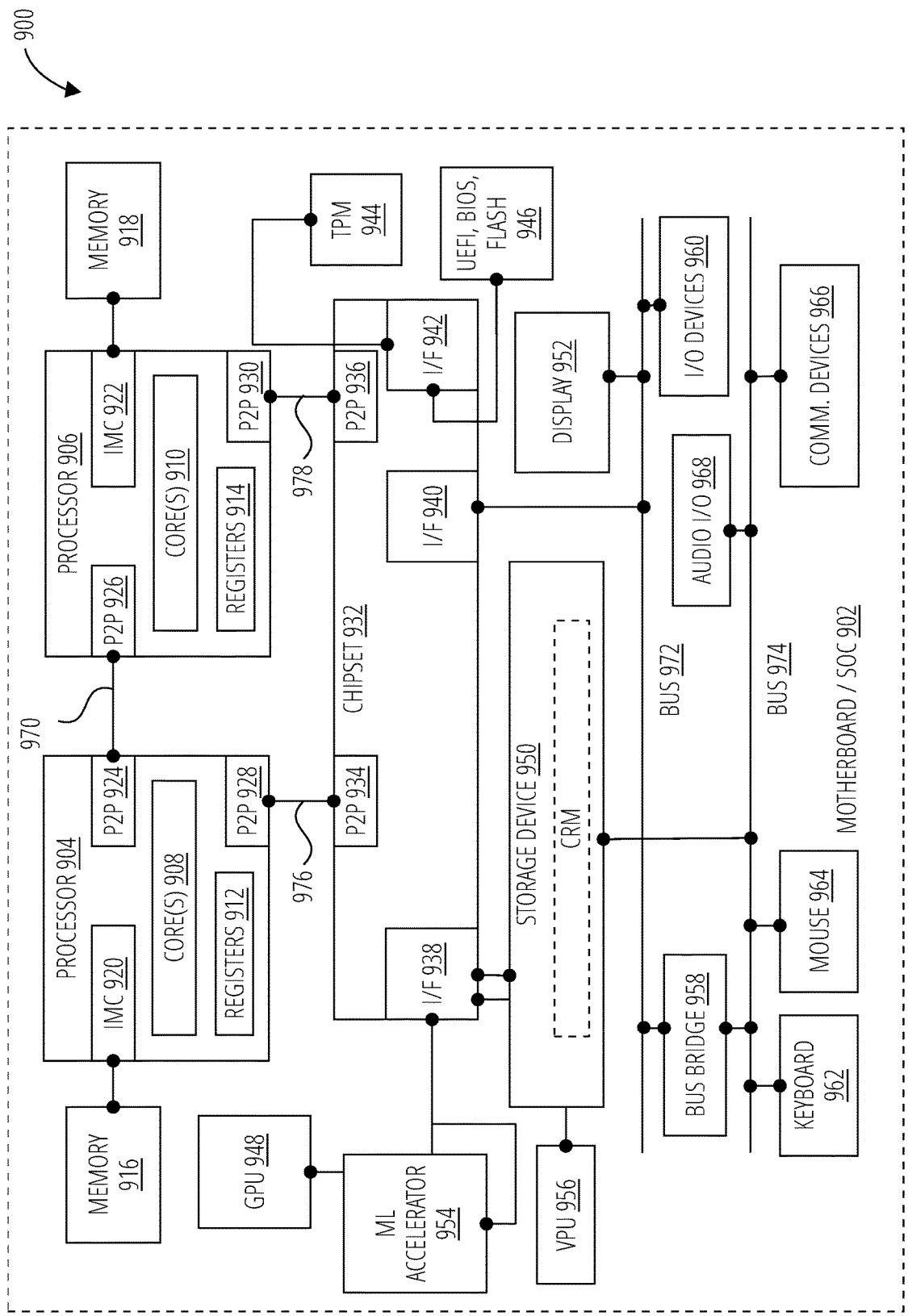
FIG. 9 illustrates an aspect of the subject matter in accordance with one embodiment.

FIG. 9 illustrates an embodiment of a system 900. System 900 is a computer system with multiple processor cores such as a distributed computing system, supercomputer, high-performance computing system, computing cluster, mainframe computer, mini-computer, client-server system, personal computer (PC), workstation, server, portable computer, laptop computer, tablet computer, handheld device such as a personal digital assistant (PDA), or other device for processing, displaying, or transmitting information. Similar embodiments may comprise, e.g., entertainment devices such as a portable music player or a portable video player, a smart phone or other cellular phone, a telephone, a digital video camera, a digital still camera, an external storage device, or the like. Further embodiments implement larger scale server configurations. In other embodiments, the system 900 may have a single processor with one core or more than one processor. Note that the term "processor" refers to a processor with a single core or a processor package with multiple processor cores. In at least one embodiment, the computing system 900 is representative of the components of autonomous vehicle 102, system 200, or stakeholder device 500. More generally, the computing system 900 is configured to implement all logic, systems, logic flows, methods, apparatuses, and functionality described herein with reference to FIG. 1, FIG. 2, FIG. 3A, FIG. 3B, FIG. 3C, FIG. 4A, FIG. 4B, FIG. 5, FIG. 6, FIG. 7, and FIG. 8.

As used in this application, the terms "system" and "component" and "module" are intended to refer to a computer-related entity, either hardware, a combination of hardware and software, software, or software in execution, examples of which are provided by the exemplary system 900. For example, a component can be, but is not limited to being, a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers. Further, components may be communicatively coupled to each other by various types of communications media to coordinate operations. The coordination may involve the uni-directional or bi-directional exchange of information. For instance, the components may communicate information in the form of signals communicated over the communications media. The information can be implemented as signals allocated to various signal lines. In such allocations, each message is a signal. Further embodiments, however, may alternatively employ data messages. Such data messages may be sent across various connections. Exemplary connections include parallel interfaces, serial interfaces, and bus interfaces.

As shown in this figure, system 900 comprises a motherboard or system-on-chip(SoC) 902 for mounting platform components. Motherboard or system-on-chip(SoC) 902 is a point-to-point (P2P) interconnect platform that includes a first processor 904 and a second processor 906 coupled via a point-to-point interconnect 970 such as an Ultra Path Interconnect (UPI). In other embodiments, the system 900 may be of another bus architecture, such as a multi-drop bus. Furthermore, each of processor 904 and processor 906 may be processor packages with multiple processor cores including core(s) 908 and core(s) 910, respectively. While the system 900 is an example of a two-socket (2S) platform, other embodiments may include more than two sockets or one socket. For example, some embodiments may include a four-socket (4S) platform or an eight-socket (8S) platform. Each socket is a mount for a processor and may have a socket identifier. Note that the term platform refers to the motherboard with certain components mounted such as the processor 904 and chipset 932. Some platforms may include additional components and some platforms may only include sockets to mount the processors and/or the chipset. Furthermore, some platforms may not have sockets (e.g. SoC, or the like).

The processor 904 and processor 906 can be any of various commercially available processors, including without limitation an Intel® Celeron®, Core®, Core (2) Duo®, Itanium®, Pentium®, Xeon®, and XScale® processors; AMD® Athlon®, Duron® and Opteron® processors; ARM® application, embedded and secure processors; IBM® and Motorola@ DragonBall® and PowerPC® processors; IBM and Sony® Cell processors; and similar processors. Dual microprocessors, multi-core processors, and other multi processor architectures may also be employed as the processor 904 and/or processor 906. Additionally, the processor 904 need not be identical to processor 906.

Processor 904 includes an integrated memory controller (IMC) 920 and point-to-point (P2P) interface 924 and P2P interface 928. Similarly, the processor 906 includes an IMC 922 as well as P2P interface 926 and P2P interface 930. IMC 920 and IMC 922 couple the processors processor 904 and processor 906, respectively, to respective memories (e.g., memory 916 and memory 918). Memory 916 and memory 918 may be portions of the main memory (e.g., a dynamic random-access memory (DRAM)) for the platform such as double data rate type 3 (DDR3) or type 4 (DDR4) synchronous DRAM (SDRAM). In the present embodiment, the memories memory 916 and memory 918 locally attach to the respective processors (i.e., processor 904 and processor 906). In other embodiments, the main memory may couple with the processors via a bus and shared memory hub.

System 900 includes chipset 932 coupled to processor 904 and processor 906. Furthermore, chipset 932 can be coupled to storage device 950, for example, via an interface (I/F) 938. The I/F 938 may be, for example, a Peripheral Component Interconnect-enhanced (PCI-e). Storage device 950 can store instructions executable by circuitry of system 900 (e.g., processor 904, processor 906, GPU 948, ML accelerator 954, vision processing unit 956, or the like). For example, storage device 950 can store instructions for logic flow 400a, intra-transportation attestation loop 400b, or the like.

Processor 904 couples to a chipset 932 via P2P interface 928 and P2P 934 while processor 906 couples to a chipset 932 via P2P interface 930 and P2P 936. Direct media interface (DMI) 976 and DMI 978 may couple the P2P interface 928 and the P2P 934 and the P2P interface 930 and P2P 936, respectively. DMI 976 and DMI 978 may be a high-speed interconnect that facilitates, e.g., eight Giga Transfers per second (GT/s) such as DMI 3.0. In other embodiments, the processor 904 and processor 906 may interconnect via a bus.

The chipset 932 may comprise a controller hub such as a platform controller hub (PCH). The chipset 932 may include a system clock to perform clocking functions and include interfaces for an I/O bus such as a universal serial bus (USB), peripheral component interconnects (PCIs), serial peripheral interconnects (SPIs), integrated interconnects (I2Cs), and the like, to facilitate connection of peripheral devices on the platform. In other embodiments, the chipset 932 may comprise more than one controller hub such as a chipset with a memory controller hub, a graphics controller hub, and an input/output (I/O) controller hub.

In the depicted example, chipset 932 couples with a trusted platform module (TPM) 944 and UEFI, BIOS, FLASH circuitry 946 via I/F 942. The TPM 944 is a dedicated microcontroller designed to secure hardware by integrating cryptographic keys into devices. The UEFI, BIOS, FLASH circuitry 946 may provide pre-boot code.

Furthermore, chipset 932 includes the I/F 938 to couple chipset 932 with a high-performance graphics engine, such as, graphics processing circuitry or a graphics processing unit (GPU) 948. In other embodiments, the system 900 may include a flexible display interface (FDI) (not shown) between the processor 904 and/or the processor 906 and the chipset 932. The FDI interconnects a graphics processor core in one or more of processor 904 and/or processor 906 with the chipset 932.

Additionally, ML accelerator 954 and/or vision processing unit 956 can be coupled to chipset 932 via I/F 938. ML accelerator 954 can be circuitry arranged to execute ML related operations (e.g., training, inference, etc.) for ML models. Likewise, vision processing unit 956 can be circuitry arranged to execute vision processing specific or related operations. In particular, ML accelerator 954 and/or vision processing unit 956 can be arranged to execute mathematical operations and/or operands useful for machine learning, neural network processing, artificial intelligence, vision processing, etc.

Various I/O devices 960 and display 952 couple to the bus 972, along with a bus bridge 958 which couples the bus 972 to a second bus 974 and an I/F 940 that connects the bus 972 with the chipset 932. In one embodiment, the second bus 974 may be a low pin count (LPC) bus. Various devices may couple to the second bus 974 including, for example, a keyboard 962, a mouse 964 and communication devices 966.

Furthermore, an audio I/O 968 may couple to second bus 974. Many of the I/O devices 960 and communication devices 966 may reside on the motherboard or system-on-chip(SoC) 902 while the keyboard 962 and the mouse 964 may be add-on peripherals. In other embodiments, some or all the I/O devices 960 and communication devices 966 are add-on peripherals and do not reside on the motherboard or system-on-chip(SoC) 902.

The components and features of the devices described above may be implemented using any combination of: processing circuitry, discrete circuitry, application specific integrated circuits (ASICs), logic gates and/or single chip architectures, etc. Further, the features of the devices may be implemented using microcontrollers, programmable logic arrays and/or microprocessors or any combination of the foregoing where suitably appropriate. It is noted that hardware, firmware and/or software elements may be collectively or individually referred to herein as "logic" or "circuit."

Some embodiments may be described using the expression "one embodiment" or "an embodiment" along with their derivatives. These terms mean that a particular feature, structure, or characteristic described in connection with the embodiment is included in at least one embodiment. The appearances of the phrase "in one embodiment" in various places in the specification are not necessarily all referring to the same embodiment. Further, some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to allow a reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

What has been described above includes examples of the disclosed architecture. It is, of course, not possible to describe every conceivable combination of components and/or methodology, but one of ordinary skill in the art may recognize that many further combinations and permutations are possible. Accordingly, the novel architecture is intended to embrace all such alterations, modifications and variations that fall within the spirit and scope of the appended claims.

The following examples pertain to further embodiments, from which numerous permutations and configurations will be apparent.

Example 1

A computing apparatus comprising: circuitry; and memory coupled to the circuitry, the memory storing instructions, which when executed by the circuitry cause the apparatus to: receive, from one or more sensors, one or more parameter states, the one or more parameter states associated with an autonomous vehicle (AV) transporting cargo; discretizing the one or more parameter states; generate, based on a shared key and a hash seed, a keyed hash digest of the discretized one or more parameter states; and send the keyed hash digest to a stakeholder to attest to the integrity of the cargo transported by the AV.

Example 2

The computing apparatus of example 1, the memory storing instructions that when executed by the circuitry further cause the apparatus to: identify a parameter value associated with a first one of the parameter states, the first one of the parameter states associated with a first parameter state range; and determine a partition of a plurality of partitions of the first parameter state range for the parameter value.

Example 3

The computing apparatus of example 1, the memory storing instructions that when executed by the circuitry further cause the apparatus to: receive, from the one or more sensors, one or more intra-transportation parameter states, the one or more intra-transportation parameter states associated with the cargo during transport by the AV; discretizing the one or more intra-transportation parameter states; generate, based on the shared key and the keyed hash digest, an intra-transportation keyed hash digest of the discretized one or more intra-transportation parameter states; and send the intra-transportation hash to the stakeholder to attest to the integrity of the cargo.

Example 4

The computing apparatus of example 3, the memory storing instructions that when executed by the circuitry further cause the apparatus to: receive, from the one or more sensors, one or more updated intra-transportation parameter states, the one or more updated intra-transportation parameter states associated with the cargo during transport by the AV; discretizing the one or more updated intra-transportation parameter states; generate, based on the shared key and the intra-transportation keyed hash digest, an updated intra-transportation hash of the discretized one or more updated intra-transportation parameter states; and send the updated intra-transportation hash to the stakeholder to attest to the integrity of the cargo.

Example 5

The computing apparatus of example 3, the memory storing instructions that when executed by the circuitry further cause the apparatus to: receive, from the one or more sensors, one or more post-transportation parameter states, the one or more post-transportation parameter states associated with the cargo at a conclusion of transport by the AV; discretizing the one or more post-transportation parameter states; generate, based on the shared key and the intra-transportation keyed hash digest, a post-transportation keyed hash digest of the discretized one or more post-transportation parameter states; and send the post-transportation hash to the stakeholder to attest to the integrity of the cargo at the conclusion of the transportation.

Example 6

The computing apparatus of example 1, the memory storing instructions that when executed by the circuitry further cause the apparatus to send the hash to the stakeholder via a wireless network connection.

Example 7

The computing apparatus of example 1, the one or more sensors comprising at least one of a temperature sensor, a microphone, a camera, a speedometer, a lock state sensor, a biometric sensor, and a proximity sensor.

Example 8

A non-transitory computer-readable storage device, the computer-readable storage device to store instructions that when executed by circuitry, cause the circuitry to: receive, from one or more sensors, one or more parameter states, the one or more parameter states associated with an autonomous vehicle (AV) transporting cargo; discretizing the one or more parameter states; generate, based on a shared key and a hash seed, a keyed hash digest of the discretized one or more parameter states; and send the keyed hash digest to a stakeholder to attest to the integrity of the cargo transported by the AV.

Example 9

The non-transitory computer-readable storage device of example 8, comprising instructions that when executed by the circuitry cause the circuitry to: identify a parameter value associated with a first one of the parameter states, the first one of the parameter states associated with a first parameter state range; and determine a partition of a plurality of partitions of the first parameter state range for the parameter value.

Example 10

The non-transitory computer-readable storage device of example 8, comprising instructions that when executed by the circuitry cause the circuitry to: receive, from the one or more sensor, one or more intra-transportation parameter states, the one or more intra-transportation parameter states associated with the cargo during transport by the AV; discretizing the one or more intra-transportation parameter states; generate, based on the shared key and the keyed hash digest, an intra-transportation keyed hash digest of the discretized one or more intra-transportation parameter states; and send the intra-transportation keyed hash digest to the stakeholder to attest to the integrity of the cargo.

Example 11

The non-transitory computer-readable storage device of example 10, comprising instructions that when executed by the circuitry cause the circuitry to: receive, from the one or more sensors, one or more updated intra-transportation parameter states, the one or more updated intra-transportation parameter states associated with the cargo during transport by the AV; discretizing the one or more updated intra-transportation parameter states; generate, based on the shared key and the intra-transportation keyed hash digest, an updated intra-transportation keyed hash digest of the discretized one or more intra-transportation parameter states; and send the updated intra-transportation keyed hash digest to the stakeholder to attest to the integrity of the cargo.

Example 12

The non-transitory computer-readable storage device of example 10, comprising instructions that when executed by the circuitry cause the circuitry to: receive, from the one or more sensors, one or more post-transportation parameter states, the one or more post-transportation parameter states associated with the cargo at a conclusion of transport by the AV; discretizing the one or more post-transportation parameter states; generate, based on the shared key and the intra-transportation keyed hash digest, a post-transportation keyed hash digest of the discretized one or more post-transportation parameter states; and send the post-transportation hash to the stakeholder to attest to the integrity of the cargo at the conclusion of the transportation.

Example 13

The non-transitory computer-readable storage device of example 8, comprising instructions that when executed by the circuitry cause the circuitry to send the keyed hash digest to the stakeholder via a wireless network connection.

Example 14

The non-transitory computer-readable storage device of example 8, the one or more sensors comprising at least one of a temperature sensor, a microphone, a camera, a speedometer, a lock state sensor, an biometric sensor, and a proximity sensor.

Example 15

A method comprising: receiving, from one or more sensors, one or more parameter states, the one or more parameter states associated with an autonomous vehicle (AV) transporting cargo; discretizing the one or more parameter states; generating, based on a shared key and a hash seed, a keyed hash digest of the discretized one or more parameter states; and sending the keyed hash digest to a stakeholder to attest to the integrity of the cargo transported by the AV.

Example 16

The method of example 15, discretizing the one or more parameter states comprising: identifying a parameter value associated with a first one of the parameter states, the first one of the parameter states associated with a first parameter state range; and determining a partition of a plurality of partitions of the first parameter state range for the parameter value.

Example 17

The method of example 15, comprising: receiving, from the one or more sensors, one or more intra-transportation parameter states, the one or more intra-transportation parameter states associated with the cargo during transport by the AV; discretizing the one or more intra-transportation parameter states; generating, based on the shared key and the hash seed, an intra-transportation keyed hash digest of the discretized one or more intra-transportation parameter states; and sending the intra-transportation keyed hash digest to the stakeholder to attest to the integrity of the cargo.

Example 18

The method of example 17, comprising: receiving, from the one or more sensors, one or more updated intra-transportation parameter states, the one or more updated intra-transportation parameter states associated with the cargo during transport by the AV; discretizing the one or more updated intra-transportation parameter states; generating, based on the shared key and the intra-transportation keyed hash digest, an updated intra-transportation keyed hash digest of the discretized one or more updated intra-transportation parameter states; and sending the updated intra-transportation keyed hash digest to the stakeholder to attest to the integrity of the cargo.

Example 19

The method of example 17, comprising: receiving, from the one or more sensors, one or more post-transportation parameter states, the one or more post-transportation parameter states associated with the cargo at a conclusion of transport by the AV; discretizing the one or more post-transportation parameter states; generating, based on the shared key and the intra-transportation keyed hash digest, a post-transportation keyed hash digest of the discretized one or more post-transportation parameter states; and sending the post-transportation keyed hash digest to the stakeholder to attest to the integrity of the cargo at the conclusion of the transportation.

Example 20

The method of example 15, comprising sending the keyed hash digest to the stakeholder via a wireless network connection.

Example 21

The method of example 15, the one or more sensors comprising at least one of a temperature sensor, a microphone, a camera, a speedometer, a lock state sensor, an biometric sensor, and a proximity sensor.

Example 22

An apparatus, comprising means arranged to implement the function of any one of examples 15 to 21.

Example 23

A system for an autonomous vehicle (AV), comprising: an in-vehicle network (IVN); a plurality of sensors coupled to the IVN; circuitry; and memory coupled to the circuitry, the memory storing instructions, which when executed by the circuitry cause the circuitry to: receive, from one or more of the plurality of sensors, one or more parameter states, the one or more parameter states associated with the AV transporting cargo; discretizing the one or more parameter states; generate, based on a shared key and a hash seed, a keyed hash digest of the discretized one or more parameter states; and send the keyed hash digest to a stakeholder to attest to the integrity of the cargo transported by the AV.

Example 24

The system of example 23, the memory storing instructions that when executed by the circuitry further cause the apparatus to: identify a parameter value associated with a first one of the parameter states, the first one of the parameter states associated with a first parameter state range; and determine a partition of a plurality of partitions of the first parameter state range for the parameter value.

Example 25

The system of example 23, the memory storing instructions that when executed by the circuitry further cause the apparatus to: receive, from the one or more sensors, one or more intra-transportation parameter states, the one or more intra-transportation parameter states associated with the cargo during transport by the AV; discretizing the one or more intra-transportation parameter states; generate, based on the shared key and the keyed hash digest, an intra-transportation keyed hash digest of the discretized one or more intra-transportation parameter states; and send the intra-transportation hash to the stakeholder to attest to the integrity of the cargo.

Example 26

The system of example 25, the memory storing instructions that when executed by the circuitry further cause the apparatus to: receive, from the one or more sensors, one or more updated intra-transportation parameter states, the one or more updated intra-transportation parameter states associated with the cargo during transport by the AV; discretizing the one or more updated intra-transportation parameter states; generate, based on the shared key and the intra-transportation keyed hash digest, an updated intra-transportation hash of the discretized one or more updated intra-transportation parameter states; and send the updated intra-transportation hash to the stakeholder to attest to the integrity of the cargo.

Example 27

The system of example 25, the memory storing instructions that when executed by the circuitry further cause the apparatus to: receive, from the one or more sensors, one or more post-transportation parameter states, the one or more post-transportation parameter states associated with the cargo at a conclusion of transport by the AV; discretizing the one or more post-transportation parameter states; generate, based on the shared key and the intra-transportation keyed hash digest, a post-transportation keyed hash digest of the discretized one or more post-transportation parameter states; and send the post-transportation hash to the stakeholder to attest to the integrity of the cargo at the conclusion of the transportation.

Example 28

The system of example 23, the memory storing instructions that when executed by the circuitry further cause the apparatus to send the hash to the stakeholder via a wireless network connection.

Example 29

The system of example 23, the one or more sensors comprising at least one of a temperature sensor, a microphone, a camera, a speedometer, a lock state sensor, a biometric sensor, and a proximity sensor.

What is claimed is:

1. A computing apparatus comprising:
processor circuitry coupled to memory, the processor circuitry to facilitate continuous integrity monitoring for autonomous transportation services, the processor circuitry to:
receive, from one or more sensors associated with a cargo, one or more parameter states relating to the cargo being transported using an autonomous vehicle (AV), wherein the one or more parameter states include one or more intra-transportation parameter states associated with the cargo;
continuously monitor integrity of the cargo based on the one or more parameter states to continuously check for a breach in a transportation contract relating to transportation of the cargo by the AV, wherein to monitor includes to generate a keyed hash digest based on discretization of the one or more intra-transportation parameter states, wherein the keyed hash digest includes indicators to continuously indicate a compliance status of the transportation contract to attest to the integrity of the cargo and to instruct a stakeholder to keep in place control signals for the AV to continue to proceed with the cargo in accordance with the transportation contract;
generate, based on a shared key and a keyed hash digest, an intra-transportation keyed hash digest of the discretized one or more intra-transportation parameter states;
send an intra-transportation hash of the intra-transportation keyed hash digest to the stakeholder to attest to the integrity of the cargo; and
receive, from the one or more sensors, one or more post-transportation states, the one or more post-transportation parameter states are associated with the cargo at a conclusion of transport by the AV, discretize the one or more post-transportation parameter states, generate, based on the shared key and the intra-transportation keyed hash digest, a post-transportation keyed hash digest of the discretized one or more post-transportation parameter states, and send post-transportation hash to the stakeholder to attest to the integrity of the cargo at the conclusion of the transportation.

2. The computing apparatus of claim 1, wherein the processor circuitry is further to:
identify a parameter value associated with a first one of the parameter states, the first one of the parameter states associated with a first parameter state range; and
determine a partition of a plurality of partitions of the first parameter state range for the parameter value.

3. The computing apparatus of claim 1, wherein the processor circuitry is further to:
receive, from the one or more sensors, the one or more intra-transportation parameter states, the one or more intra-transportation parameter states associated with the cargo during transport by the AV.

4. The computing apparatus of claim 1, wherein the one or more sensors comprise at least one of a temperature sensor, a microphone, a camera, a speedometer, a lock state sensor, a biometric sensor, or a proximity sensor.

5. A non-transitory computer-readable medium having stored thereon instructions which, when executed, cause a computing device to perform operations comprising:
receiving, from one or more sensors associated with a cargo, one or more parameter states relating to the cargo being transported using an autonomous vehicle (AV), wherein the one or more parameter states include one or more intra-transportation parameter states associated with the cargo;
continuously monitoring integrity of the cargo based on the one or more parameter states to continuously check for a breach in a transportation contract relating to transportation of the cargo by the AV, wherein monitoring includes generating a keyed hash digest based on discretization of the one or more intra-transportation parameter states, wherein the keyed hash digest includes indicators to continuously indicate a compliance status of the transportation contract to attest to the integrity of the cargo and to instruct a stakeholder to keep in place control signals for the AV to continue to proceed with the cargo in accordance with the transportation contract;
generating, based on a shared key and a keyed hash digest, an intra-transportation keyed hash digest of the discretized one or more intra-transportation parameter states;
sending an intra-transportation hash of the intra-transportation keyed hash digest to the stakeholder to attest to the integrity of the cargo; and
receiving, from the one or more sensors, one or more post-transportation states, the one or more post-transportation parameter states are associated with the cargo at a conclusion of transport by the AV, discretizing the one or more post-transportation parameter states, generating, based on the shared key and the intra-transportation keyed hash digest, a post-transportation keyed hash digest of the discretized one or more post-transportation parameter states, and sending post-transportation hash to the stakeholder to attest to the integrity of the cargo at the conclusion of the transportation.

6. The non-transitory computer-readable medium of claim 5, wherein the operations further comprise:
identifying a parameter value associated with a first one of the parameter states, the first one of the parameter states associated with a first parameter state range; and determining a partition of a plurality of partitions of the first parameter state range for the parameter value.

7. The non-transitory computer-readable medium of claim 5, wherein the operations further comprise:
receiving, from the one or more sensor, one or more intra-transportation parameter states, the one or more intra-transportation parameter states associated with the cargo during transport by the AV.

8. The non-transitory computer-readable medium of claim 5, wherein the one or more sensors comprise at least one of a temperature sensor, a microphone, a camera, a speedometer, a lock state sensor, a biometric sensor, or a proximity sensor.

9. A method comprising:
receiving, by processing circuitry of a computing device, from one or more sensors associated with a cargo, one or more parameter states relating to the cargo being transported using an autonomous vehicle (AV), wherein the one or more parameter states include one or more intra-transportation parameter states associated with the cargo;
continuously monitoring integrity of the cargo based on the one or more parameter states to continuously check for a breach in a transportation contract relating to transportation of the cargo by the AV, wherein monitoring includes generating a keyed hash digest based on discretization of the one or more intra-transportation parameter states, wherein the keyed hash digest includes indicators to continuously indicate a compliance status of the transportation contract to attest to the integrity of the cargo and to instruct a stakeholder to keep in place control signals for the AV to continue to proceed with the cargo in accordance with the transportation contract;
generating, based on a shared key and a keyed hash digest, an intra-transportation keyed hash digest of the discretized one or more intra-transportation parameter states;
sending an intra-transportation hash of the intra-transportation keyed hash digest to the stakeholder to attest to the integrity of the cargo; and
receiving, from the one or more sensors, one or more post-transportation states, the one or more post-transportation parameter states are associated with the cargo at a conclusion of transport by the AV, discretizing the one or more post-transportation parameter states, generating, based on the shared key and the intra-transportation keyed hash digest, a post-transportation keyed hash digest of the discretized one or more post-transportation parameter states, and sending post-transportation hash to the stakeholder to attest to the integrity of the cargo at the conclusion of the transportation.

10. The method of claim 9, wherein discretizing the one or more parameter states comprising:
identifying a parameter value associated with a first one of the parameter states, the first one of the parameter states associated with a first parameter state range; and
determining a partition of a plurality of partitions of the first parameter state range for the parameter value.

11. The method of claim 9, further comprising:
receiving, from the one or more sensors, one or more intra-transportation parameter states, the one or more intra-transportation parameter states associated with the cargo during transport by the AV.

12. The method of claim 9, wherein the one or more sensors comprise at least one of a temperature sensor, a microphone, a camera, a speedometer, a lock state sensor, a biometric sensor, or a proximity sensor.

* * * * *